US006832068B2

(12) United States Patent
Anderson et al.

(10) Patent No.: US 6,832,068 B2
(45) Date of Patent: Dec. 14, 2004

(54) APPARATUS AND METHOD THAT PROVIDES AN INPUT REFERENCE LOCATION

(75) Inventors: Todd J. Anderson, Fort Collins, CO (US); Nigel M. Cheung, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/368,270

(22) Filed: Feb. 17, 2003

(65) Prior Publication Data

US 2004/0161273 A1 Aug. 19, 2004

(51) Int. Cl.[7] .............................................. G03G 15/00
(52) U.S. Cl. ......................................... 399/377; 399/18
(58) Field of Search .............................. 399/16, 17, 18, 399/23, 365, 367, 370, 371, 372, 376, 377, 378, 379, 389, 391

(56) References Cited

U.S. PATENT DOCUMENTS

| | | | | | |
|---|---|---|---|---|---|
| 4,260,248 | A | * | 4/1981 | Murata et al. | 355/60 |
| 5,311,248 | A | * | 5/1994 | Iwata | 355/61 |
| 5,504,661 | A | * | 4/1996 | Szpak | 362/30 |
| 5,710,967 | A | * | 1/1998 | Motoyama | 399/377 |
| 6,173,422 | B1 | * | 1/2001 | Kimura et al. | 714/57 |
| 6,263,184 | B1 | * | 7/2001 | Diederiks, Jr. | 399/377 |
| 6,369,800 | B1 | * | 4/2002 | Nading et al. | 345/168 |
| 6,629,134 | B2 | * | 9/2003 | Hayward et al. | 709/217 |
| 6,666,086 | B2 | * | 12/2003 | Colman et al. | 73/304 C |

FOREIGN PATENT DOCUMENTS

| | | |
|---|---|---|
| EP | 0 400 490 | 12/1990 |
| JP | 2003029355 | 1/2003 |

* cited by examiner

*Primary Examiner*—Ren Yan

(57) ABSTRACT

One embodiment of the invention is an imaging device comprising an illuminated reference locator that comprises an illuminated surface that identifies an input location that receives an object to be imaged by the imaging device.

24 Claims, 3 Drawing Sheets

APPARATUS AND METHOD THAT PROVIDES AN INPUT REFERENCE LOCATION

FIELD OF THE INVENTION

This invention relates in general to imaging devices and in specific to an apparatus and method for providing an input reference location.

DESCRIPTION OF THE RELATED ART

Imaging devices, e.g. computers, facsimile devices, scanners, and/or photocopiers, typically receive an input that comprises a paper document. The paper document, medium, or object is then imaged, e.g., scanned, by the device and converted into a digital representation of the paper document. The digital representation may then be processed by the device. Note that a paper document may comprise text data and/or image data.

A critical element of the scanning is the proper alignment of the paper document in the device. Improper alignment may cause a mis-scan of the document, or may cause a jam or other malfunction of the device.

To prevent this problem, imaging devices typically include reference locators to mark the placement positions for the paper document. Multiple reference locators are often used to indicate the proper positions for different sizes of paper (e.g., 8½ by 11, A4), as well as different orientations of paper (e.g., portrait or landscape). Such locators are typically molded into the case or cover of the device or painted onto the device.

However, molded locators are the same color as the case, and thus are often overlooked by the user. Similarly, painted locators will often wear off or be marked over, and thus overlooked by the user.

Imaging devices also typically include a screen, e.g., LCD screen, that provides diagnostic messages to a user. The screen may be a full-size screen or a smaller screen such as a 5-line screen. These types of screens provide detailed text or graphic based images that describe an error or problem to a user. The screen may instead be an even smaller screen, e.g. a 2 or 3 character screen, that provides an alphanumeric error code to a user. The user may then consult a manual or reference card to determine to which problem the alphanumeric error code text or graphic refers. Alternatively the user may contact support personnel and relay the alphanumeric error code text or graphic to them. These screens are very useful in diagnosing problems with the device, but are relatively costly in terms of the parts needed, as well as their assembly into the device.

BRIEF SUMMARY OF THE INVENTION

One embodiment of the invention is an imaging device comprising an illuminated reference locator that comprises an illuminated surface that identifies an input location that receives an object to be imaged by the imaging device.

Another embodiment of the invention is a system for scanning an object to form a representation of the object, comprising an illuminated reference locator that identifies an input location of the system; wherein the input location receives the object.

A further embodiment of the invention is a system for scanning an object to form a representation of the object, comprising means for identifying an input location on the device, wherein the input location receives the object, and means for illuminating the means for identifying.

A further embodiment of the invention is a method for scanning comprising an illuminated reference locator, aligning an object using the illuminated reference locator, and scanning the object.

DETAILED DESCRIPTION

Embodiments of the invention provide at least one illuminated reference locator to mark at least one placement position for an input to an imaging device. The device may comprise a computer, a facsimile device, a scanner, multi-function device, and/or a photocopier. The input may comprise paper document(s), medium, media, or other objects, such as text, images, three-dimension objects, or any other object that can be scanned or connected into a digital image that includes text and/or image data. Embodiments of the invention may also provide error codes for diagnostic purposes by having the illuminated reference locator flash a predetermined number of times and/or in a predetermined sequence.

The illuminated reference locator(s) disclosed herein may each comprise at least one light source, e.g. a light emitting diode (LED) light, florescent lamp, or an incandescent light bulb. The illuminated reference locator may alternatively comprise a translucent portion of the case of the device, which is then illuminated by a light source such as a scanning lamp of the device. This embodiment is preferred when the device is equipped with such a scanning lamp and the initial position of the scanning lamp is located beneath the translucent portion of the case. Note that error codes may be generated by flashing the light source or the scanning lamp.

Figure 1:
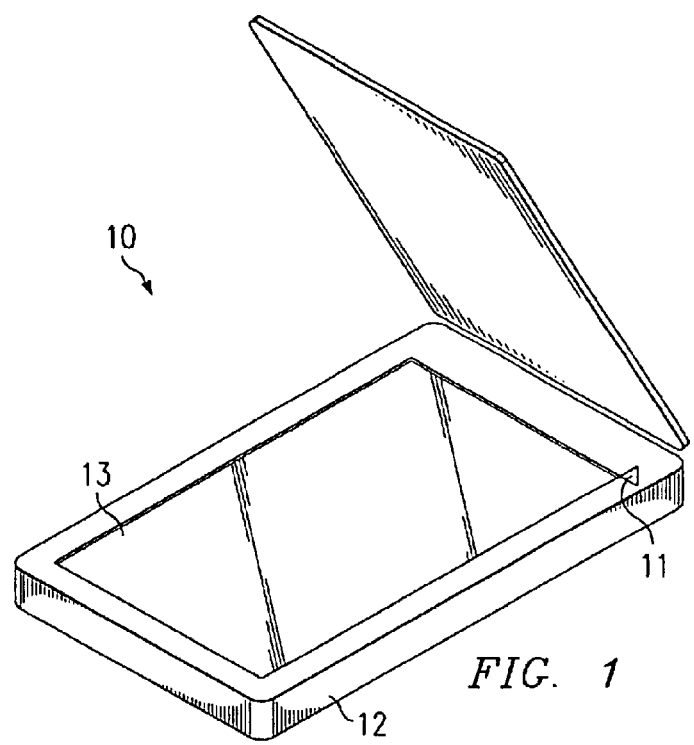
FIG. 1 depicts a first embodiment providing input reference location consideration with the teachings of the invention.

FIG. 1 depicts an example of an embodiment comprising an imaging device 12. Device 12 may be a computer, facsimile device, scanner, and/or photocopier. Device 12 includes scanning surface 13 that would receive an input, e.g. a paper document or other object. The input is then scanned by the device and converted into a representation of the input, e.g. a digital image or xerographic image. The device may then perform further processing of the digital representation or conclude after the conversion.

Reference locator 11 is preferably used by a user to properly align an object on the scanning surface 13. Note that number and placement of the reference locator is by way of example only as additional locators may be present on device 12, and/or the locator(s) may be in different positions on the device 12. In this embodiment, the reference locator 11 is preferably illuminated by a light source, for example a light emitting diode (LED) or an incandescent light bulb. This light source may be wired to be always on when the system 10 is powered on. Alternatively, the light source may be on when the system is ready to operate (as opposed to a warm up or wait state).

Further note that the triangular shape of the locator 11 is by way of example only as other shapes could be used. For example, FIGS. 5A–5D depict locators having a geometric shape, e.g., diamond or parallelogram shape 51, a circular shape 52, a teardrop shape 53, and an elliptical shape 54. Other shapes could include a polygon, a square, a rectangle, and a trapezoid (not shown). The reference locator may also comprise a text (e.g. 'here') or a graphic (e.g. a pointing hand, an arrow, or an 'x'). The text or graphic could comprise illuminated text or graphic, or the text or graph could be dark with an illuminated background. Note that the different reference locators may be used for all of the embodiments of the invention described herein.

Figure 2A:
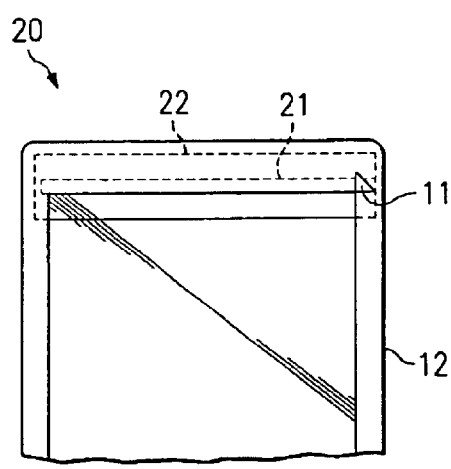
FIGS. 2A and 2B depict further embodiments consistent with the teachings of the invention.

FIG. 2A depicts another embodiment of the invention. In this embodiment, system 20 comprises scanning lamp 21 that is used to illuminate a translucent reference locator. For example, in scanners, the scanning lamp is typically a cold-cathode fluorescent lamp 21 that is part of a lamp assembly 22, which moves relative to surface 13 to illuminate an object for scanning. In this example, the lamp assembly 22 is in its 'home' or ready-to-scan position. The reference locator is located directly above the lamp 21, when the lamp assembly is in the home position. Thus, light from the lamp 21 may be used to illuminate the reference locator. The lamp assembly is presumed to be in its home position while a user would be loading the object. The lamp assembly would move from its home position during scanning, which would occur after loading has been completed. Translucent is meant to include clear, color-filtered, and diffuse light.

The reference locator may be formed by placing a piece of material over a hole in the case or housing of the device 12. The material may comprise plastic and may be snapped into place in the hole. The reference locator may also be formed by having a portion of the housing be molded or shaped to be relatively thin in thickness. Note that relatively thin is as compared to other portions of the housing. The portion forming the reference locator would be thin enough to be translucent or transparent to the light from the lamp. The other portions of the housing would be thick enough to be more opaque to the light from the lamp (but not necessarily fully opaque) as compared to the thin portion.

The translucent reference locator may be colored a different color than that of the housing. For example, the housing may be white and the reference locator may be red or green. Alternatively, the reference locator may be the same color as the housing, for example where the reference locator is a relatively thin portion of the housing. Note that the coloring of the reference locators applies to all of the embodiments of the invention described herein.

Figure 2B:
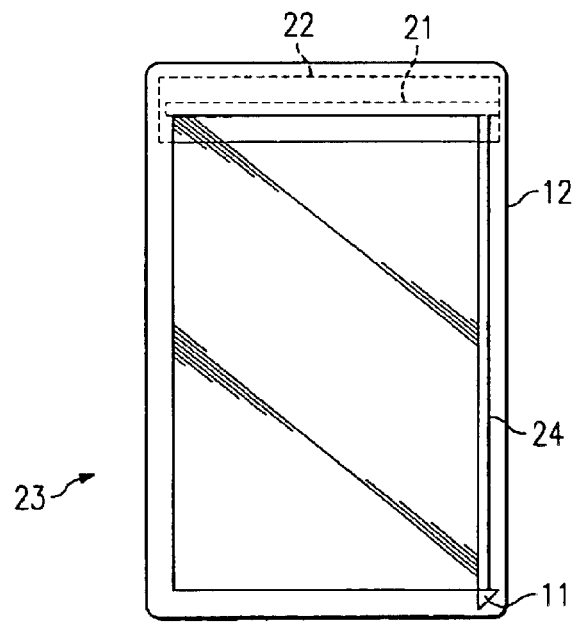

FIG. 2B depicts an alternative arrangement 23 for the example of FIG. 2A. In this example, the reference locator 11 is located away from the home position of the lamp assembly 22. A light guide 24, e.g. a fiber optic or light pipe, is used to deliver the light from the lamp 21 to the reference locator 11. Note that the light guide may move with the assembly, thus keeping the reference locator illuminated as long as the lamp is on, or the light guide may be fixed, and thus only illuminate the reference locator while the lamp assembly is at the home position. Note that a moveable light guide may be used with the system of FIG. 2A to keep the reference locator illuminated as long as the lamp is on.

Figure 6:
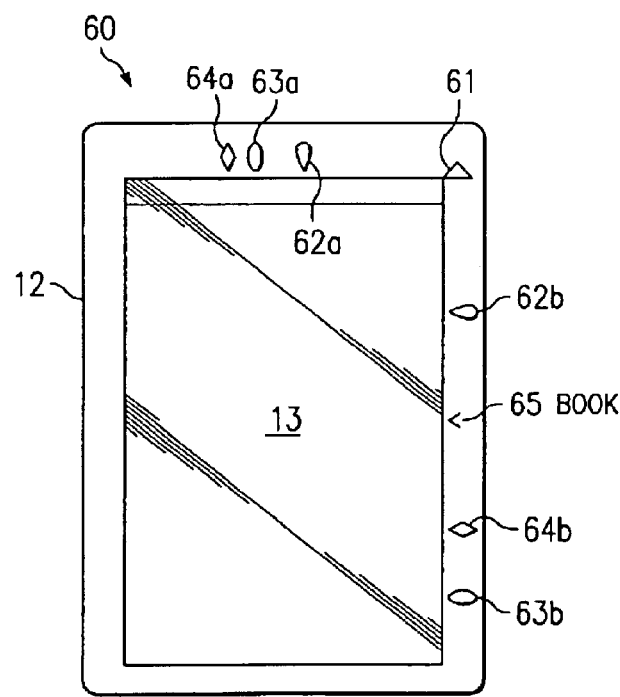
FIG. 6 depicts an example of a device having a plurality of reference locators according to an embodiment of the invention.
Figure 7:
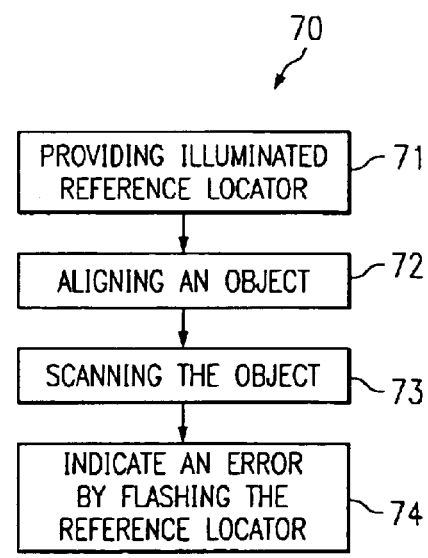
FIG. 7 depicts an example of a method of scanning according to embodiments of the invention.

Note that the devices may have more than one illuminated reference locator. For example, as shown in FIG. 6, system 60 comprises a device 12 having a plurality of reference locators. The different locators could be used to indicate different alignment positions for different objects to be scanned. For example, locator 61 could indicate the initial position for most objects. Locators 62a, 62b could indicate the boundaries of a 4×6 inch picture. Locators 63a, 63b could indicate the boundaries for an A4-sized document. Locators 64a, 64b could indicate the boundaries for an 8½×11 inch document. Locator 65 could indicate placement of a book for separately scanning each page. Note that the different sets of locators have been shown having different shapes, however common shapes could have been used, in some embodiments with different colors. Further note that the different locators could have different colors as well.

Figure 3:
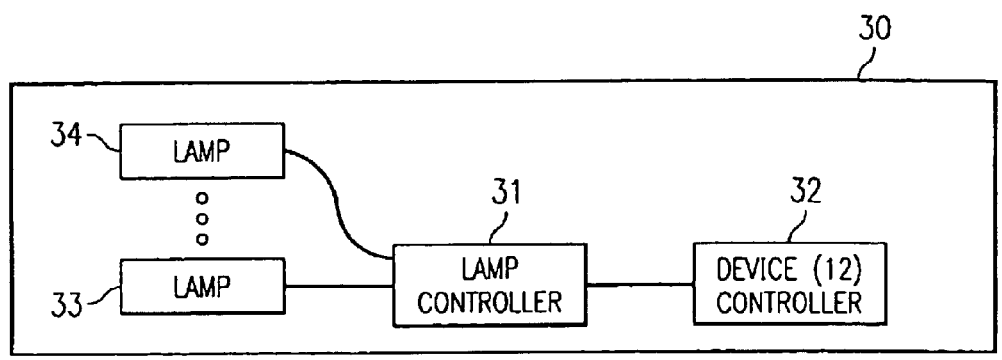
FIG. 3 depicts an example of a system for use with the embodiments of FIGS. 1, 2A and 2B.

Embodiments of the reference indicator may also be used to identify one or more error codes that are representative of the error(s) that the device has experienced. System 30 of FIG. 3 could be used to control the scanning lamp or the light bulb(s) to cause the reference indicator to flash, blink, or turn on and off to identify the appropriate error code. Lamp controller 31 would be connected to the scanning lamp 33 or to each light 33, 34 used to illuminate the reference indicator(s). The lamp controller 31 is connected to device controller 32. The device controller notifies the lamp controller of errors and their type. Note if a plurality of reference indicators are used in the system, at least one may be used to indicate the error code. Only those lights used to illuminate the reference indicators that are used to indicate the error code are connected to lamp controller 31.

The reference indicator may be flashed to indicate an error code. The reference indicator may be flashed a specific number of times to indicate an error code. For example, the number of times that the indicator is flashed may define an error code, e.g. the indicator flashes 15 times, indicating an error corresponding to error code 15.

Figure 4A:
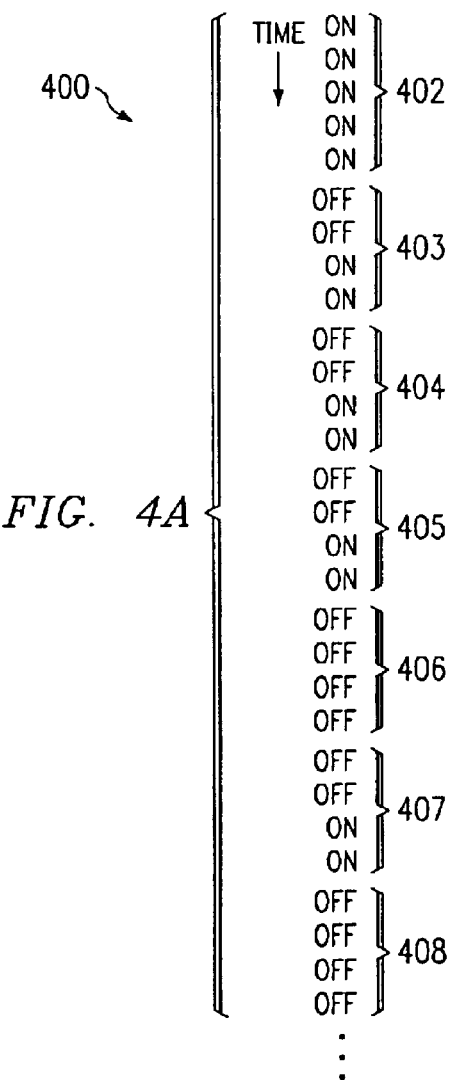
FIGS. 4A and 4B depict examples of error code identification according to embodiments of the invention.

Another example, is shown in FIG. 4A, wherein the reference indicator is on during normal operations 402. After an error is received, or after the device is placed in diagnostic mode by a user, the reference indicator begins flashing. Three flashes 403, 404, 405 are followed by an off period indicating the next number 406. One flash 407 then follows. The reference indicator may then return to normal operations 402, repeat the number sequence 403-407, or then turn off 408. The error code is noted to be 31, for three flashes one flash. A user (or technical support personnel) could then look up error code 31 to determine the problem with the device and/or a corrective course of action.

Figure 4B:
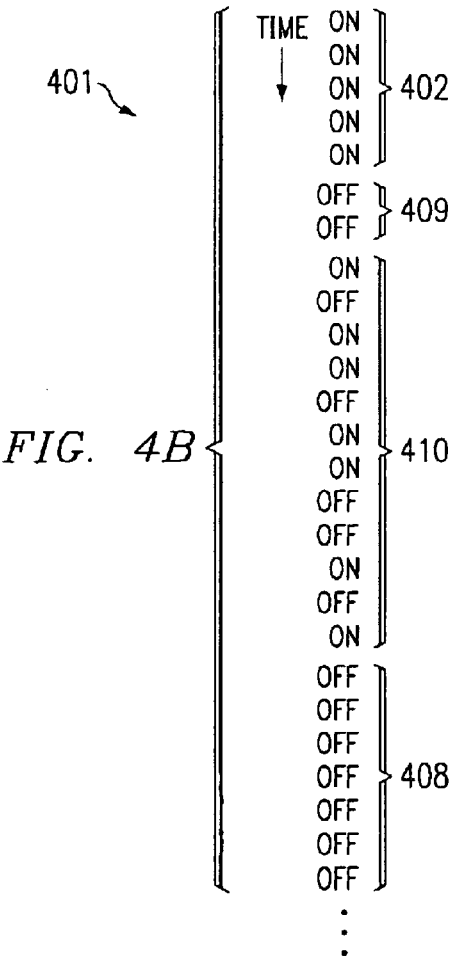
Figure 5A:
FIGS. 5A, 5B, 5C, and 5D depict alternative embodiments for reference locators according to the invention.
Figure 5C:
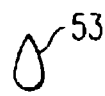
Figure 5B:
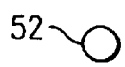
Figure 5D:
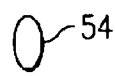

The reference indicator may also flash a specific sequence to indicate an error code (e.g., Morse code). For example, as shown in FIG. 4B, the reference indicator is on during normal operations 402. After an error is received, or after the device is placed in diagnostic mode by a user, the reference indicator turns off to indicate that an error code will follow 409. Flashing pattern 410 is then provided by the reference indicator. The flashing pattern 410 comprises a series of long and short on periods, as well as long and short off periods. The reference indicator may then return to normal operations 402, repeat the pattern 410, or then turn off 408. A user (or technical support personnel) could then look up the pattern to determine the problem with the device and/or a corrective course of action. The reference indicator may also be used to signal the status of the system. For example, it could indicate a ready status, an error status, a warm-up status, and/or an in-process status. For example, the different statuses could be indicated by flashing different indicators or by having an indicator flash different colors, e.g., red for error, green for ready, yellow for warm-up, etc.

What is claimed is:

1. An imaging device comprising:

an illuminated reference locator that comprises an illuminated surface that identifies an input location that receives an object to be imaged by the imaging devices;

wherein the illuminated surface is a translucent portion of a housing of the device, and wherein light from a lamp used by the device for scanning can be detected through the translucent portion.

2. The imaging device of claim 1, wherein the reference locator is selected from the group consisting of:

a graphic, text, and a geometric shape.

3. The imaging device of claim 1, wherein the reference locator has a color formed by a manner selected from the group consisting of:

a color filter, a colored lamp that produces colored light, and a color of a housing of the device through which illumination may be detected.

4. The imaging device of claim 1, wherein the translucent portion comprises:

a light filter attached to the housing.

5. The imaging device of claim 1, wherein the translucent portion comprises:

a relatively thin area of the housing as compared to other portions of the housing.

6. An imaging device comprising:

an illuminated reference locator that comprises an illuminated surface that identifies an input location that receives an object to be imaged by the imaging device;

wherein the reference locator further indicates an error code.

7. The imaging device of claim 6, wherein the reference locator flashes a predetermined number of times to indicate the error code.

8. The imaging device of claim 6, wherein the reference locator flashes in a predetermined sequence to indicate the error code.

9. The imaging device of claim 6, wherein the reference locator flashes one of a plurality of colors, wherein each color identifies a particular status of the imaging device.

10. The imaging device of claim 6, wherein the reference locator is one reference locator of a plurality of reference locators, and a particular reference locator will flash to indicate a particular status of the imaging device.

11. A system for scanning an object to form a representation of the object, comprising:

an illuminated reference locator that identifies an input location of the system; and a housing for containing the system:

wherein the input location receives the object, and the reference locator is a translucent portion of the housing of the device, and light from a lamp used by the system for scanning is used to illuminate the reference locator.

12. The system of claim 11, wherein the object is selected from a group consisting of:

a document, a three-dimensional object, and an image.

13. The system of claim 11, wherein the device is selected from the group consisting of:

a scanner, a facsimile device, a computer, and a photocopier.

14. The system of claim 11, wherein:

the lamp is at least one light emitting diode.

15. The system of claim 11, further comprising:

a light guide for transporting the light from the lamp to the reference locator.

16. The system of claim 11, wherein the translucent portion comprises:

a light filter attached to the housing.

17. The system of claim 11, wherein the translucent portion comprises:

a relatively thin area of the housing as compared to other portions of the housing.

18. The system of claim 11, wherein the reference locator identifies an error code.

19. The system of claim 18, wherein the reference locator flashes a predetermined number of times to indicate the error code.

20. The system of claim 18, wherein the reference locator flashes in a predetermined sequence to indicate the error code.

21. A system for scanning an object to form a representation of the object, comprising:

means for identifying an input location on the device, wherein the input location receives the object;

means for illuminating the means for identifying; and means for controlling the means for illuminating so as to indicate an error code by flashing the means for illuminating.

22. A method for scanning comprising:

providing an illuminated reference locator;

aligning an object using the illuminated reference locator;

scanning the object; and indicating an error by flashing the reference locator.

23. A system for scanning an object to form a representation of the object, comprising:

means for identifying an input location on the device, wherein the input location receives the object; and means for illuminating the means for identifying and for illuminating the object for scanning.

24. A method for scanning comprising:

providing a lamp illuminating a reference locator using the lamp;

aligning an object using the illuminated reference locator; and scanning the object using the lamp.

* * * * *